Nov. 29, 1955 J. W. GRATIAN ET AL 2,725,430

MAGNETIC RECORDING HEAD

Filed Feb. 6, 1953 2 Sheets-Sheet 1

INVENTORS.
JOSEPH W. GRATIAN
NORMAN COLE

BY Philip S. [signature]

THEIR AGENT

MAGNETIC RECORDING HEAD

Filed Feb. 6, 1953 2 Sheets-Sheet 2

INVENTORS.
JOSEPH W. GRATIAN
NORMAN COLE
BY [signature]
THEIR AGENT

United States Patent Office 2,725,430
Patented Nov. 29, 1955

2,725,430

MAGNETIC RECORDING HEAD

Joseph W. Gratian, Rochester, and Norman Cole, Webster, N. Y., assignors, by mesne assignments, to General Dynamics Corporation, a corporation of Delaware Application February 6, 1953, Serial No. 335,502

8 Claims. (Cl. 179—100.2)

Our invention relates to magnetic recording devices, and more particularly to magnetic recording heads for such devices.

Magnetic recording heads employed heretofore have generally been formed from a number of laminations stamped from a flat sheet of magnetic material and clamped side by side, with one edge of the resulting core structure positioned adjacent the magnetic recording medium. The latter is most popularly a tape of non-magnetic material coated on one side with finely divided magnetic particles. The laminations have their center portion punched out so that a looped magnetic circuit is formed. The edge of the core adjacent the tape has an airgap formed therein, and another side of the core is encircled with a winding of wire which converts an electric current into a magnetic field, or vice versa. Because of the small size and critical dimensions involved, magnetic recording heads of this type have been difficult and costly to construct, and their low-frequency response characteristics have not been satisfactory for many applications.

It is accordingly an object of our invention to provide a head for a magnetic recording apparatus which is simple in construction and may be quickly made.

It is another object of our invention to provide a head for a magnetic recording apparatus which affords a much improved low-frequency response compared to conventional heads.

In general, we accomplish these and other objects of our invention by providing a head having a core with at least one lamination of magnetic material. This lamination has a strip shape, and is oriented with its width dimension substantially perpendicular to the direction of travel of the magnetic recording medium.

The foregoing and other objects and advantages of our invention will become apparent as the following description proceeds, and the features of novelty which characterize our invention will be pointed out with particularity in the claims annexed to and forming a part of this specification.

For a better understanding of our invention, reference may be had to the accompanying drawing in which:

Fig. 1 is a diagram helpful in explaining the exampled embodiment of our invention;

Fig. 2 indicates the physical arrangement of one embodiment of our invention;

We have chosen to show our invention as applied to a reproducing head arrangement employing a cathode ray tube. Since this type of pickup head is not widely known, we have included herein a short exposition thereof.

Figure 1:
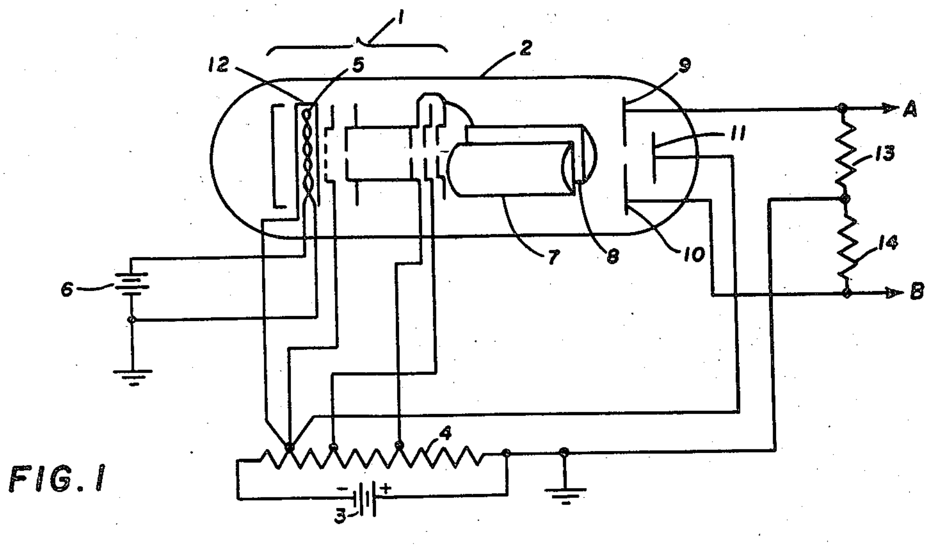

Referring to Fig. 1, a cathode ray electron gun 1 is enclosed at one end of an envelope 2, which may be made of glass. The various elements of the electron gun are supplied with appropriate voltages, according to techniques well known to those skilled in the art, from battery 3 and voltage divider 4. The heater 5 of the electron gun may be supplied with energy from battery 6. The electron beam formed in gun 1 has a relatively broad diameter.

A pair of magnetic pole pieces, 7 and 8, are located for deflection of the beam emerging from electron gun 1. This beam may be deflected up or down by creating a magnetic field between pole pieces 7 and 8. These pole pieces are preferably made of a low-retentivity, high-permeability magnetic material; consequently, a field may be set up between pole pieces 7 and 8 by establishing a magnetic field outside the envelope 2.

When no field is present between pole pieces 7 and 8, the electron beam passes down the center of envelope 2. Some electrons strike collector plate 9, and an equal quantity strike plate 10. Those electrons which strike neither plate pass through the space between plates 9 and 10 and fall on plate 11, which is connected to the same potential as cathode 12 of the electron gun.

When a magnetic field is applied outside the tube envelope 2 to produce a field between magnetic pole pieces 7 and 8, the electron beam is deflected either up or down, depending upon the direction of the lines of flux of the field. If the deflection is up, more electrons are collected on plate 9 than on plate 10, or if the beam is deflected down, the opposite condition obtains.

The electrons collected by plates 9 and 10 are returned to gun potential through resistors 13 and 14. From the foregoing explanation, it is apparent that the voltages developed across resistors 13 and 14, and which therefore appear at points A and B, respectively, as a result of electron flow, are push-pull in nature, and may be utilized, or amplified by any well known means, such as a vacuum tube amplifier. Neither the amplification means nor a utilization device has been illustrated because the nature of such means depends upon the application of the magnetic recording apparatus, and in any event is well known to those skilled in the art.

Figures 2, 3:
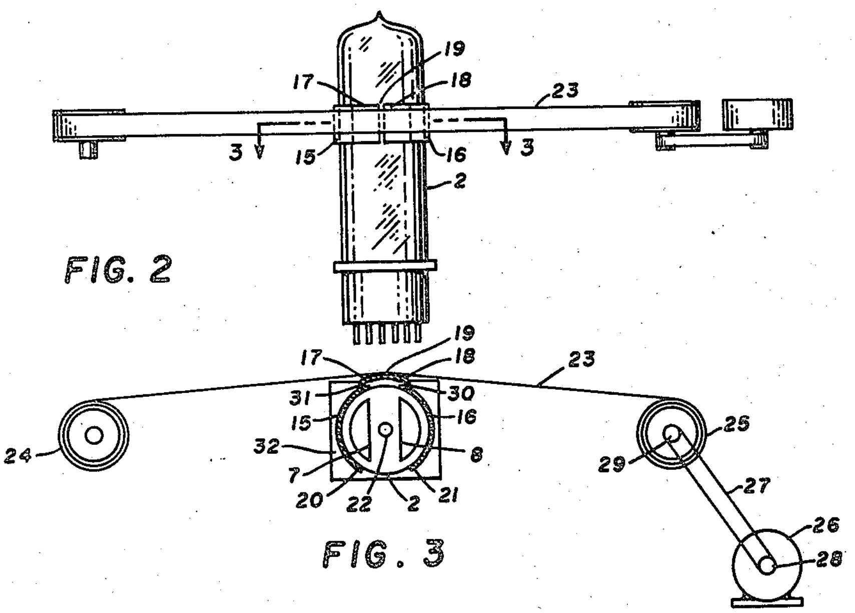
Fig. 3 is a sectional view, taken along line 3—3, of the embodiment shown in Fig. 2.

The manner in which the arrangement of Fig. 1 may be employed with one embodiment of our invention to provide a magnetic recording pickup head is shown in Figs. 2 and 3. We provide a pair of laminations, 15 and 16, which are of strip shape, as shown, and are positioned in sequence around the envelope 2 of the cathode ray tube. The end 17 of lamination 15 is located relative to end 18 of lamination 16 to define airgap 19. Ends 20 and 21 of laminations 15 and 16, respectively, are spaced apart to provide a substantial degree of magnetic insulation relative to each other. Thus, flux which is transferred from airgap 19 to laminations 15 and 16 forms a field between the central portions thereof. Since plates 7 and 8 are in this field, a field is set up between these plates and serves to deflect the cathode ray tube beam 22. Thus, if the field in airgap 19 increases in intensity, the field between pole pieces 7 and 8 also will increase and deflect beam 22 up or down, depending upon the direction of flux in gap 19.

The flux in airgap 19 is derived from the magnetic medium 23 which is transported past the magnetic recording head at substantially uniform speed. Medium 23 may be a magnetic tape unwound from storage reel 24 onto take-up reel 25 by means of an electric motor 26. which drives take-up reel 25 via belt 27 passing over pulleys 28 and 29.

It is a feature of our invention that laminations 15 and 16 may be wider than the width of medium 23. This substantially improves the low-frequency response of the head. It is a further feature of our invention that ends 17 and 18 of laminations 15 and 16, respectively, are displaced radially outward from cathode ray tube 2 in the portions 30 and 31 adjacent to airgap 19. This allows a magnetic insulating material, such as a plastic, to be cast under these portions and so to form a support for the laminations in the region adjacent to, and in, airgap 19. We may prefer that laminations 15 and 16 be encased in a block 32 of plastic material, thereby to embed the entire assembly and so to maintain the alignment between the parts permanently. Contrary to popular belief, we have found that displacements 30 and 31, if not unreasonably large, do not impair low frequency response.

It is a further feature of our invention that the portion of lamination 15 from displacement 31 to end 17, and the portion of lamination 16 from displacement 30 to end 18 may be formed with a slightly rising curvature, so that tape 23 is brought into intimate contact with gap 19.

Figure 4:
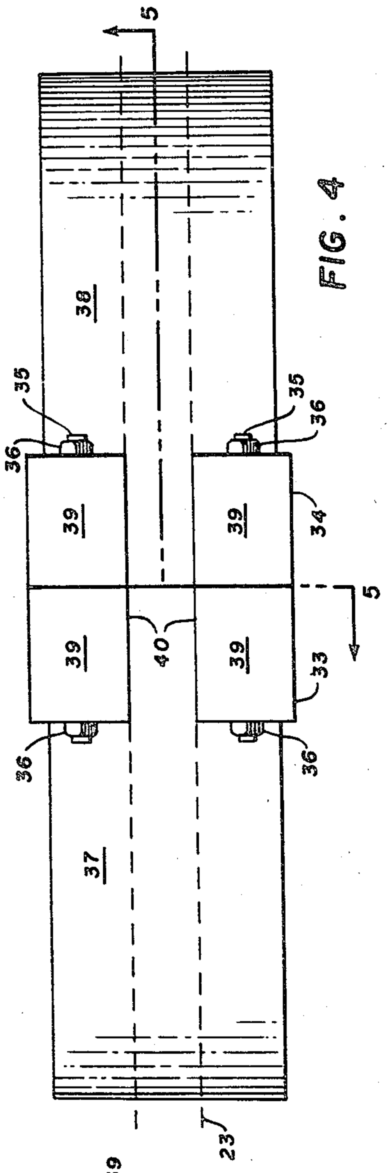
Fig. 4 is a top view of another embodiment of our invention.
Figure 5:
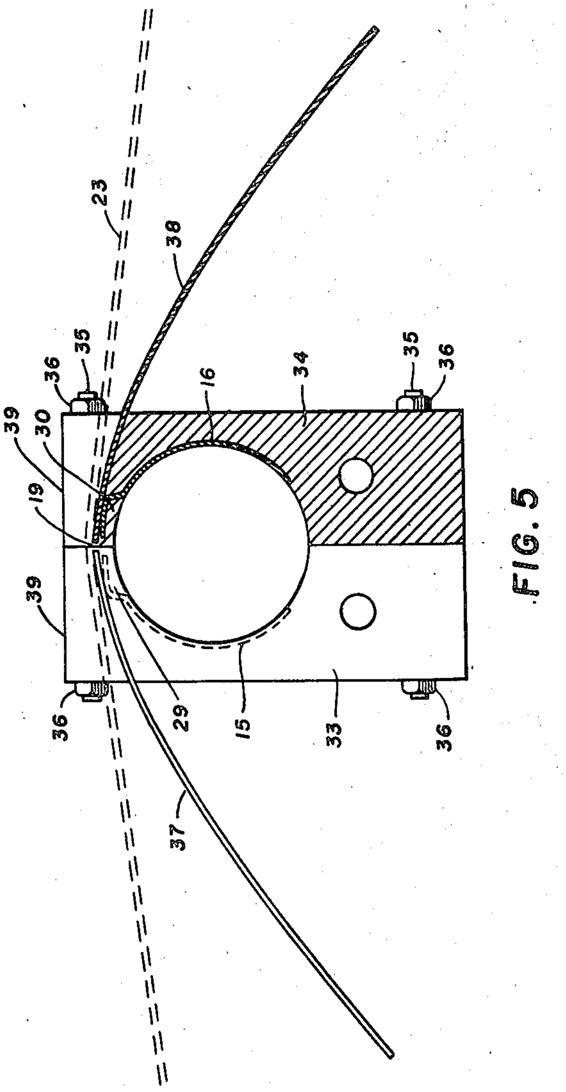
Fig. 5 is a sectional view, taken along line 5—5, of the embodiment of Fig. 4.
Figure 6:
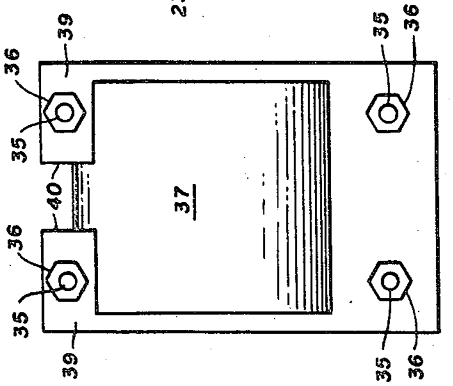
Fig. 6 is an end view of the embodiment of Fig. 4.

A preferred embodiment of our invention is shown in Figs. 4, 5 and 6. Here again, as in Fig. 2, a pair of laminations is used and each is displaced radially outward from the envelope position of the tube in the region of airgap 19. However, each lamination is cast in its own half-block of plastic. These half-blocks, designated by reference numeral 33 in the case of lamination 15 and reference numeral 34 in the case of lamination 16, use an embedding material of sufficient dimensional stability to permit the halves 33 and 34 to be fitted together to define airgap 19 whose critical dimensions are correct. Blocks 33 and 34 may be held together by any convenient means, such as threaded studs 35 on which are run nuts 36. As in the case of Fig. 2, we prefer that laminations 15 and 16 be made wider than the width of the magnetic recording tape used.

In addition to laminations 15 and 16, we may prefer to provide, in accordance with our invention, a pair of additional magnetic members 37 and 38. Member 38 is positioned to extend the magnetic path established by lamination 16 away from the airgap in the direction of travel of the medium, while magnetic member 37 is positioned to extend the magnetic path established by lamination 15 in the direction opposite to the direction of travel of the medium. Magnetic members 37 and 38 preferably have an arcuate contour, but are oriented relative to each other in the region adjacent to airgap 19 to provide a sharper curvature than the arcuate contour, and so to furnish an intimate contact of the recording medium with the airgap. Half-blocks 33 and 34 may be cast with upper guide portions 39 of appropriate width, leaving space for medium 23, indicated in dashed lines in Figs. 4 and 5, to pass between guide faces 40.

Figure 7:
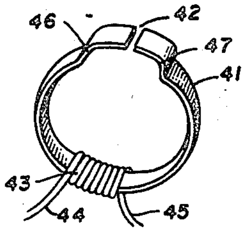
Fig. 7 is an isometric view of another embodiment of our invention.

Fig. 7 shows an embodiment of our invention which does not use the cathode-ray arrangement of Fig. 1. In Fig. 4, a core 41 of generally looped configuration has an airgap 42 in series therewith. Airgap 42 is oriented relative to the recording medium like airgap 19 in Fig. 2, and hence illustration of this orientation has not been regarded as necessary. A winding 43 converts the flux in core 41 to an electric current which may be derived from leads 44 and 45, and thence fed to amplifiers or other conventional apparatus not shown.

The head of Fig. 7 is distinguished by the fact that core 41 is formed of a strip-shaped lamination, with its width preferably greater than the width of the medium. Portions 46 and 47 may be displaced radially outward from the center of the core as pointed out in connection with Fig. 2, and the entire assembly may be embedded in a suitable material, such as plastic, to maintain the critical dimensions of airgap 42.

While we have shown and described our invention as applied to a specific embodiment thereof, other modifications will readily occur to those skilled in the art. For example, those skilled in the art can readily appreciate that more than one lamination may be employed according to our invention, and that plural laminations may be concentrically disposed. We do not, therefore, desire our invention to be limited to the specific arrangement shown and described, and we intend in the appended claims to cover all modifications within the spirit and scope of our invention.

What we claim is:

1. In a head for a magnetic recording apparatus in which a longitudinal magnetic recording medium is transported past said head at substantially uniform speed, the combination of a core of generally cylindrical, strip-shaped contour comprising at least one lamination of magnetic material, said lamination being wider than said medium, the central axis of said core being positioned perpendicular to the direction of travel of said medium, said core having an airgap in the circumference thereof with said airgap positioned substantially adjacent to said medium, the width dimension of said gap being parallel to the direction of travel of said medium, said lamination being displaced radially outward in the portions adjacent said airgap, plastic material surrounding said portions to form a support for said lamination in the region adjacent to and in said airgap; and means for translating magnetic energy to electrical energy.

2. In a head for a magnetic recording apparatus in which a longitudinal magnetic recording medium is transported past said head at substantially uniform speed, the combination of a core of generally cylindrical, strip-shaped contour comprising at least one lamination of magnetic material, said lamination being wider than said medium, the central axis of said core being positioned perpendicular to the direction of travel of said medium, said core having an airgap in the circumference thereof with said airgap positioned substantially adjacent to said medium, the width dimension of said gap being parallel to the direction of travel of said medium; an additional magnetic member extending the magnetic path established by said lamination along the longitudinal dimension of said medium away from said airgap; and means for translating magnetic energy to electrical energy.

3. In a head for a magnetic recording apparatus in which a longitudinal magnetic recording medium is transported past said head at substantially uniform speed, the combination of a cathode ray tube adapted for translation of energy between magnetic flux and an electric current, said cathode ray tube having a pair of magnetic deflection pole pieces, and a core for transferring flux from said medium to said pole pieces, said core comprising at least a pair of laminations of strip shape, said laminations being wider than said medium, the width dimension of said laminations being perpendicular to the direction of travel of said medium, said laminations being positioned in sequence around said cathode ray tube with one end of one said lamination located relative to one end of the other said lamination to define an airgap therebetween; the remaining ends of said lamination being spaced apart to provide a substantial degree of magnetic insulation relative to each other, said laminations being located around said cathode ray tube to provide magnetic coupling with corresponding ones of said pole pieces, said head being positioned relative to said medium such that said airgap is adjacent said medium, said laminations being displaced radially outward from the envelope of said cathode ray tube in the portions adjacent said airgap; and plastic material surrounding said portions to form a support for said laminations in the region adjacent to and in said airgap.

4. In a head for a magnetic recording apparatus in which a longitudinal magnetic recording medium is transported past said head at substantially uniform speed, the combination of a cathode ray tube adapted for translation of energy between magnetic flux and an electric current, said cathode ray tube having a pair of magnetic deflection pole pieces, and a core for transferring flux from said medium to said pole pieces, said core comprising at least a pair of laminations of strip shape, said laminations being wider than said medium, the width dimension of said laminations being perpendicular to the direction of travel of said medium, said laminations being positioned in sequence around said cathode ray tube with one end of one said lamination located relative to one end of the other said lamination to define an airgap therebetween; and the remaining ends of said lamination being spaced apart to provide a substantial degree of magnetic insulation relative to each other, said laminations being located around said cathode ray tube to provide magnetic coupling with corresponding ones of said pole pieces, said head being positioned relative to said medium such that said airgap is adjacent said medium, at least a pair of additional magnetic members, one said member being positioned to extend the magnetic path established by one said lamination from said airgap in the direction of travel of said medium and the other of said members being positioned to extend the magnetic path established by the other of said laminations from said airgap in a direction opposite to the direction of travel of said medium.

5. The combination of claim 4 in which said magnetic members have an arcuate contour and are oriented relative to each other, in the region adjacent said airgap, to provide a sharper curvature than said arcuate contour, said magnetic medium being arranged to contact said magnetic members throughout a substantial portion of the length of said magnetic members.

6. In a head for a magnetic recording apparatus in which a longitudinal magnetic recording medium is transported past said head at substantially uniform speed, the combination of a core and a coil wound on said core, said core having a generally looped configuration with a magnetic recording airgap in series therewith, said core comprising at least one lamination of strip shape, with the width dimension thereof being greater than that of said medium and being oriented perpendicularly to the direction of travel of said medium, said airgap being oriented along the width dimension, said lamination being displaced radially outward in the portions adjacent said airgap; and plastic material surrounding said portions to form a support for said lamination in the region adjacent to and in said airgap.

7. The combination of claim 6 including a pair of additional magnetic members, one said member being positioned to extend away from said airgap in the direction of travel of said medium, and the other said member being positioned to extend away from said airgap in a direction opposite to the direction of travel of said medium.

8. The combination of claim 7 in which said magnetic members have an arcuate contour and are oriented relative to each other in the region adjacent said airgap to provide a sharper curvature than said arcuate contour, said magnetic members being located to contact said magnetic medium throughout a substantial portion of the length of said magnetic members.

References Cited in the file of this patent

UNITED STATES PATENTS

| | | |
|---|---|---|
| 2,165,307 | Skellett | July 11, 1939 |
| 2,429,792 | Begun | Oct. 28, 1949 |
| 2,469,444 | Roys | May 10, 1949 |
| 2,496,047 | Goddard | Jan. 31, 1950 |
| 2,523,576 | Kornei | Sept. 26, 1950 |